Nov. 20, 1962     R. P. MATTSON     3,064,863
VOLUMETRIC MEASURING DEVICE
Filed March 7, 1960
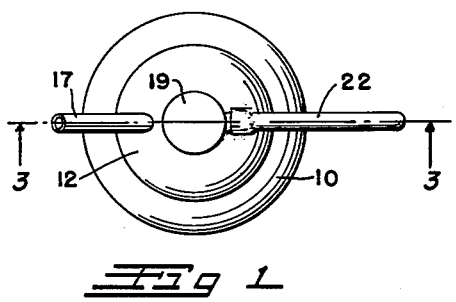
Fig. 1
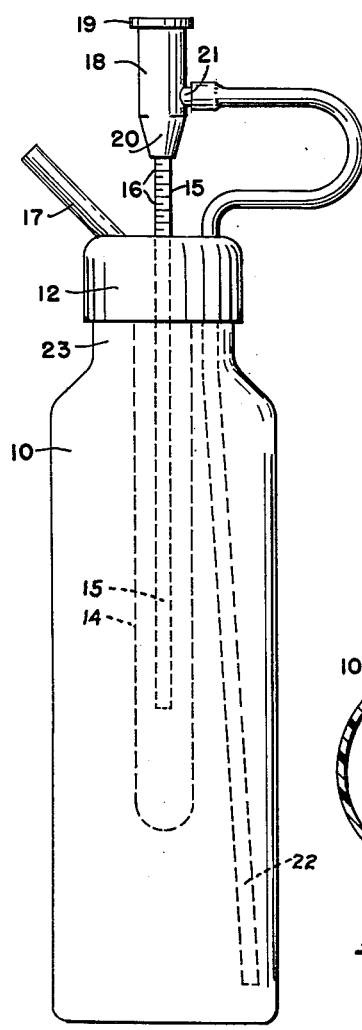
Fig. 2
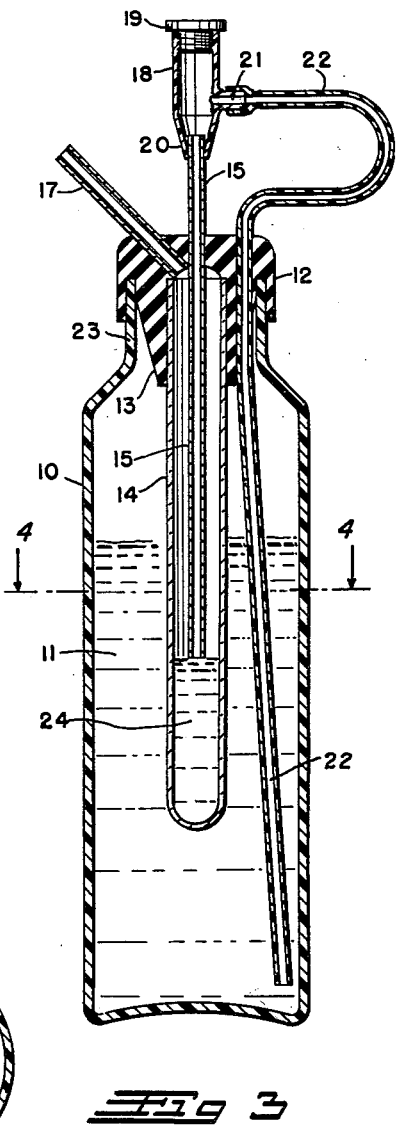
Fig. 3
Fig. 4
INVENTOR.
ROGER P. MATTSON
BY
ATTORNEY

United States Patent Office 3,064,863
Patented Nov. 20, 1962

3,064,863
VOLUMETRIC MEASURING DEVICE
Roger P. Mattson, 1004 S. Lincoln St., Casper, Wyo.
Filed Mar. 7, 1960, Ser. No. 13,240
1 Claim. (Cl. 222—205)

This invention relates to a volumetric measuring device for fluids in the nature of a burette or pipette for chemical analysis use in the titration and quantitative intermixture of various fluids.

The principal object of the invention is to provide a simple and easily used volumetric measuring device which can be quickly preset to accurately deliver any desired volume of fluid from a supply container.

Another object of the invention is to so construct the improved volumetric measuring device that it can be preset to deliver a desired quantity and which will retain its setting to repeatedly, accurately, and uniformly deliver the preset volume.

Other objects and advantages are inherent in the construction of the improved volumetric measuring device. These will become more apparent from the following description in which reference is had to the accompanying drawing which forms a part hereof.

In the drawing:

FIG. 1 is a top view of improved measuring device;

FIG. 2 is a side view thereof;

FIG. 3 is a vertical axial section taken on the line 3—3, FIG. 1; and

FIG. 4 is a cross section looking downwardly on the line 4—4, FIG. 3.

The invention employs a reservoir or container 10 of any desired size or shape and formed from flexible plastic resin of a type suitable for retaining fluids or liquids of the type upon which the invention is to be used, as indicated at 11, and capable of being flexibly compressed and deformed to force a fluid from the container. The container 10 terminates at its upper extremity in a cylindrical neck 23.

The neck 23 of the container 10 is closed by means of a cap 12 molded from rubber, neoprene, or other suitable, flexible, resilient material. The cap is preferably designed to fit downwardly over and about the exterior of the neck 23, as illustrated in FIG. 3. It may, however, be shaped to fit interiorly of the neck 23 if preferred. A hollow, tapered sleeve 13 extends downwardly from the cap 12 within the neck 23. A cylindrical measuring vessel 14 of glass or rigid transparent plastic is forced upwardly into the neck 23 into sealing engagement with the cap 12 so as to extend downwardly within the container 10. The measuring vessel 14 is of the nature of a conventional test tube having a closed bottom and an open top.

A rigid metering tube 15 is frictionally forced downwardly through an opening in the cap 12 axially of the measuring vessel 14. The metering tube 15 frictionally engages the opening in the cap 12 to form an air-tight seal therewith, yet, is adjustable upwardly and downwardly through the cap and may carry an indicating scale 16 designating a volumetric index such as cubic centimeters. A tubular pouring spout 17 extends through the cap 12 into communication with the upper extremity of the measuring vessel 14.

The metering tube 15 terminates at its upper extremity in a chambered head member 18 closed by means of a threaded plug 19. The head member 18 may be formed integrally with the metering tube 15 or may be formed from plastic material tightly fitted about the upper extremity of the metering tube 15, as shown at 20. It will be noted the metering tube extends upwardly above the bottom of the head member 18 to provide a settling chamber in the bottom thereof around the metering tube for collecting sediment or precipitates.

The upper extremity of a flexible filling hose 22 is fitted over a nipple 21 formed on one side of the head 18 and extends downwardly through the cap 12 into the container 10 alongside of and adjacent the measuring vessel 14. The filling hose 22 is fitted relatively tightly in the cap 12 to prevent the escape of fluid, yet is longitudinally adjustable through the cap so that it may be adjusted to extend downwardly into the container 10 into relatively close relation to the bottom thereof, as shown in FIG. 3. The head member 18 provides a convenient hand grip for adjusting the metering tube 15 vertically in the head 12.

Let us assume it is desired to titrate two cubic centimeters of the fluid 11 from the container 10. The metering tube 15 is adjusted vertically to the "two cubic centimeter" indication on the scale 16. This will position the lower extremity of the metering tube 15 above the bottom of the vessel 14 an accurate distance so that the cubic contents of the vessel below the lower extremity of the metering tube will equal two cubic centimeters. The container 10 is now compressed to cause the fluid 11 to be forced upwardly through the filling tube 22 into the head 18 thence downwardly through the metering tube 15 into the vessel 14 to fill the latter to a convenient height above the lower extremity of the metering tube. The pressure on the container is now released allowing the container to expand due to its inherent elasticity so as to create a partial vacuum in the container. This will allow atmospheric pressure on the fluid in the measuring vessel 14 to force the excess fluid from the vessel 14 through the metering tube and filling hose 22 back to the container 10 until the lower extremity of the metering tube 15 is reached at which time air will enter the tube 15 to break the vacuum and leave an accurately measured amount of fluid in the vessel 14, as indicated at 24 in FIG. 3.

The entire device is now tilted to pour the accurately measured amount of fluid 24 through the pouring spout 17. Repeated deliveries of the same said amount may be had by simply repeating the above procedure without further adjustment of the metering tube 15. It will be noted that fluid level in the container is of no importance as long as there is sufficient fluid to cover the lower extremity of the flexible hose 22. It will also be noted that while the vessel 14 has been illustrated for convenience within the container 10, the operation of the device is not effected by the position of the vessel 14. It could, for instance, be supported from the cap 12 exteriorally of the container 10 if desired.

While a specific form of the improvement has been described and illustrated herein, it is to be understood that the same may be varied within the scope of the appended claim, without departing from the spirit of the invention.

Having thus described the invention what is claimed and desired secured by Letters Patent is:

A volumetric measuring device comprising a necked container formed from resilient flexible material; a cap closing the neck of said container; a measuring vessel having an open top and a closed bottom mounted in said cap and extending downwardly into said container; a metering tube frictionally forced downwardly through said cap and terminating within said measuring vessel; a tubular pouring spout extending through said cap into communication with the upper extremity of said measuring vessel; a conduit extending through said cap alongside said measuring vessel and depending downwardly into said container below said measuring vessel; a flexible tube connecting the upper extremity of said conduit with the upper extremity of said metering tube to allow vertical adjustment of the latter in said cap so that compression of the walls of said container will force fluid through said conduit and through said metering tube into said measuring vessel and so that expansion of the walls of said container will cause fluid to be drawn from said measuring vessel through said metering tube and through said conduit until the fluid level in said measuring vessel reaches the lower extremity of said metering tube to break the vacuum in said container.

References Cited in the file of this patent

UNITED STATES PATENTS

| | | |
|---|---|---|
| 2,728,491 | Aneshansley | Dec. 27, 1955 |
| 2,730,270 | Heinemann | Jan. 10, 1956 |
| 2,933,376 | McBrien | Apr. 19, 1960 |
| 2,948,284 | Zakarin | Aug. 9, 1960 |

FOREIGN PATENTS

| | | |
|---|---|---|
| 158,616 | Sweden | Apr. 16, 1957 |
| 522,629 | Belgium | Sept. 30, 1953 |
| 523,963 | Belgium | Nov. 14, 1953 |
| 749,407 | Great Britain | May 23, 1956 |